United States Patent [19]

Kiyohara et al.

[11] Patent Number: 5,180,658
[45] Date of Patent: Jan. 19, 1993

[54] WHITE POLYESTER COMPOSITION AND SUPPORT FOR PHOTOGRAPHY

[75] Inventors: Kazuto Kiyohara; Hiromitsu Araki; Toshiaki Yamazaki; Ichiya Harada, all of Hino, Japan

[73] Assignee: Konica Corporation, Tokyo, Japan

[21] Appl. No.: 859,239

[22] Filed: Mar. 26, 1992

Related U.S. Application Data

[63] Continuation of Ser. No. 491,196, Mar. 9, 1990, abandoned.

[30] Foreign Application Priority Data

Mar. 16, 1989 [JP] Japan ................................. 1-64286

[51] Int. Cl.$^5$ ............................................. G03C 1/76
[52] U.S. Cl. ........................... 430/533; 430/534; 430/535
[58] Field of Search ....................... 430/533, 534, 535

[56] References Cited

U.S. PATENT DOCUMENTS

| | | | |
|---|---|---|---|
| 3,340,062 | 9/1967 | Hunter et al. | 430/533 |
| 4,158,714 | 6/1979 | Brichta et al. | 428/391 |
| 4,293,625 | 10/1981 | Myers | 430/531 |
| 4,594,315 | 6/1986 | Shibue et al. | 430/531 |
| 4,665,013 | 5/1987 | Sach et al. | 430/532 |
| 4,847,149 | 7/1989 | Kiyohara et al. | 430/532 |

FOREIGN PATENT DOCUMENTS

| | | |
|---|---|---|
| 0182253 | 5/1986 | European Pat. Off. |
| 0292120 | 11/1988 | European Pat. Off. |
| 0327768 | 8/1989 | European Pat. Off. |
| 1264747 | 3/1968 | Fed. Rep. of Germany |
| 1109369 | 4/1968 | United Kingdom |
| 1563592 | 9/1976 | United Kingdom |

OTHER PUBLICATIONS

Chemical Abstracts, vol. 100, No. 22, May 28, 1984, p. 523, abstract No. 183102km Columbus, Ohio, US; & JP-58 07 630 (Mitsubishi Paper Mills Ltd) Jan. 17, 1983.
DE 1264747 Abstract only Mar. 1968.

*Primary Examiner*—Jack P. Brammer
*Attorney, Agent, or Firm*—Frishauf, Holtz, Goodman & Woodward

[57] ABSTRACT

Disclosed are a white polyester composition comprising a polyester containing a titanium dioxide, and the titanium dioxide being one subjected to a heat treatment at a temperature of 350° C. or higher after at least one of an inorganic surface treatment and an organic surface treatment, and a support for photography having a polyester layer comprising the white polyester composition.

21 Claims, No Drawings

WHITE POLYESTER COMPOSITION AND SUPPORT FOR PHOTOGRAPHY

This application is a Continuation-In-Part, of U.S. patent application Ser. No. 07/491,196, filed Mar. 9, 1990 (abandoned).

BACKGROUND OF THE INVENTION

This invention relates to a polyester composition and a support for photography, more particularly to a support for photography having a polyester layer comprising a polyester composition containing a titanium dioxide.

In photographic materials for direct observation of photographic images, as their supports (opaque supports), resin-coated raw papers (RC raw papers) have been generally used in the art, but in recent years, there have been also used white resin films opacified by filling with white pigments such as barium sulfate, titanium dioxide, etc. as disclosed in Japanese Patent Publications Nos. 4901/1981, 30930/1985, or Japanese Unexamined Patent Publication No. 118746/1986. Also, a film which has been made translucent with the amount of the white pigment being made small has been also used for light-sensitive materials for use in both the reflection type and the transmission type to be used particularly for display, etc.

However, of these supports, still no sufficient whiteness has been obtained for those by use of titanium oxides under the present situation. Particularly, a white film comprising a polyester filled with a titanium dioxide as seen from the above-mentioned Japanese Unexamined Patent Publication No. 118746/1986 may be preferably used as the support for giving photographic images excellent in sharpness, but for giving sufficient opaqueness to such polyester filled with titanium dioxide, it is required to fill 10 % by weight or more of titanium dioxide. In the prior art, as the method for adding titanium dioxide into polyester, there are the method in which a slurry having titanium dioxide dispersed in a polyhydric alcohol such as ethylene glycol, etc. is added to a polyester polymerization system, and the method in which titanium dioxide is kneaded into a polyester polymer by means of a kneading machine such as biaxial kneader, etc. However, among these, in the above-mentioned polymerization system addition method, titanium dioxide tends to be precipitated by agglomeration in the polyhydric alcohol, and it is extremely difficult to add 10% by weight or more of titanium dioxide to the polymer which has been completely polymerized. Further, in said method, the surface of said titanium dioxide is required to have hydrophilicity for dispersing the titanium dioxide into the polyhydric alcohol, but because the polyester polymer has no such hydrophilicity, titanium dioxide tends to be agglomerated in the polymer. Such agglomeration of titanium dioxide may cause undesirably breaking during film fabrication, or generate unevenness in the film fabricated. Therefore, as the method for adding titanium dioxide to the polyester, the above-mentioned polymer kneading method which can fill a large amount of titanium dioxide with good dispersibility has been preferably used.

SUMMARY OF THE INVENTION

However, the polyester composition filled with titanium dioxide obtained by the above-mentioned kneading method, while being excellent in dispersibility of titanium dioxide, has been still insufficient with respect to whiteness. The present inventors have made various investigations, and consequently found the following fact.

That is, kneading is conventionally performed in a closed system in order to prevent oxidative deterioration of the polymer, and yet for kneading with a melted polymer, the temperature becomes as high as 300° C. In such high temperature closed system, oxygen is withdrawn from titanium dioxide, whereby $Ti^{4+}$ becomes $Ti^{3+}$ to lower whiteness of titanium dioxide.

Therefore, an object of the present invention is to provide a polyester composition containing titanium dioxide well dispersed and a support for photography, having a polyester layer comprising said polyester composition, having excellent sharpness, and improved whiteness.

The present inventors, in view of the problems as mentioned above, have intensively studied and consequently found that the above object of the present invention can be accomplished by providing a white polyester composition comprising a polyester containing a titanium dioxide, and said titanium dioxide being subjected to a heat treatment at a temperature of 350° C. or higher after at least one of an inorganic surface treatment and an organic surface treatment and a support for photography having a polyester layer comprising said white polyester composition.

DESCRIPTION OF THE PREFERRED EMBODIMENT

The titanium dioxide to be used in the present invention may be either of the rutile type and the anatase type. Also, these may be used in combination. Preferably, the anatase type may be used.

The titanium dioxide of the present invention is one subjected to the heat treatment at a temperature of 350° C. or higher after the inorganic surface treatment and/or the organic surface treatment. The inorganic surface treatment in the present invention refers to coating of the titanium dioxide particle surface with either one or both of an aluminum compound and a silicon compound, and as said aluminum compound, for example, aluminum hydroxide may be employed, while as the silicone compound, for example, silicon hydroxide may be generally employed. The inorganic treatment method is not particularly limited. For example, it can be practiced easily by adding a water-soluble compound of aluminum into an aqueous slurry of the titanium dioxide, then neutralizing the mixture to deposit the hydrated oxide of aluminum on the titanium dioxide surface, followed by filtration and drying.

Also, in the case of coating a hydrated oxide of silicon, it can be practiced similarly as in the case of the above-mentioned hydrated aluminum oxide, but water-soluble compounds of aluminum and silicon may be also added at the same time to form a complex product of aluminum and silicon (aluminosilicate) on the titanium dioxide particle surface.

The organic surface treatment in the present invention refers to coating of the titanium dioxide particle surface with an organic material, and as said organic material, those containing silicon are preferred, particularly a siloxane polymer. As such siloxane polymer, those represented by the formula:

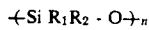

$$\mathrm{\{Si\ R_1R_2 - O\}}_n$$

$R_1$ and $R_2$ each represent hydrogen atom or an alkyl group having 1 to 8 carbon atoms, and n represents an integer of 2 or more, are preferred.

In the present invention, particularly a polydimethylsiloxane may be preferably used. The method of the organic surface treatment is not particularly limited, but, for example, the titanium dioxide and the siloxane polymer may be directly mixed by use of a mixer such as Henschel mixer, etc., or recourse may be also made to the method of spraying a siloxane polymer onto the titanium dioxide. Alternatively, after a siloxane polymer is dissolved or dispersed in an appropriate solvent, the resultant solution or dispersion may be mixed with the titanium dioxide, followed by removal of the solvent to form the treated product.

In the present invention, the mean particle size of the titanium dioxide is preferably 0.1 to 0.5 $\mu$m, and for measurement of the particle size, the sedimentation method or the electron microscope photographic method may be employed.

The content of the titanium dioxide in the polyester is not particularly limited, but the effects of the present invention can be obtained markedly when it is contained in an amount of 10% by weight or more. Of course, it can be also used in an amount less than 10% by weight.

Also, in the present invention, for making the surface of the film obtained smooth, it is preferable to classify the coarse particles having particle sizes of 3 $\mu$m or more. Classification may be performed either by the dry system or by the wet system. As the dry system, for example, a classifier such as Turbo Classifier (Nisshin Engineering K. K.) may be preferably employed, while the levigation method as the wet system.

The titanium dioxide surface treated as described above is subjected to the heat treatment at a temperature range of 350° C. or higher, preferably from 600° to 800° C. At a temperature lower than 350° C., the effects of the present invention cannot be obtained.

In the present invention, as the above-mentioned heat treatment, various methods known in the art can be employed, but it is particularly preferable to perform the heat treatment in a non-reducible atmosphere by means of a rotary kiln.

The titanium dioxide heat treated as described above is preferably further pulverized and subjected to the coating treatment with an organic material for prevent agglomeration. As the organic material to be used for such coating treatment, fatty acid metal salts, surfactants, coupling agents, alcohols, silicone oils, etc. may be employed, particularly polydimethylsiloxanes.

As the polyester in the present invention, there may be included polymers of condensates of aromatic dicarboxylic acids such as terephthalic acid, isophthalic acid, phthalic acid, naphthalene dicarboxylic acid, etc., and glycols such as ethylene glycol, 1,3-propane diol, 1,4-butane diol, etc., for example, polyethylene terephthalate (PET), polyethylene 2,6-dinaphthalate, polypropylene terephthalate, polybutylene terephthalate, etc. or copolymers thereof, particularly preferably PET.

The PET resin films do not permit water to permeate therethrough and have excellent smoothness, excellent mechanical characteristics such as tensile strength, bursting strength, etc., and further excellent dimensional stability during, e.g. thermal shrinkage and chemical resistance during developing processing.

An intrinsic viscosity measured at 20° C. in a solvent mixture of phenol/tetrachloroethane of said polyester (60/40 weight ratio) is preferably 0.4 to 1.0, more preferably 0.5 to 0.8.

In the present invention, the titanium dioxide should preferably be such that the difference in L value before and after Uv-ray irradiation at a photoenergy of 3.0 mW/cm$^2$ on a plate with a thickness of about 2 mm, comprising an injection molded product of a polyethylene terephthalate resin after addition of the titanium dioxide, for 20 hours is 1.0 or less and a support for photography having a polyester layer comprising said white polyester composition. Specifically, the method described below as an example in Examples described later may be employed.

The above Uv-ray irradiation can be practiced by, for example, Dupanel Photocontrol Weathermeter (Suga Shikenki K. K.) at a photoenergy of 3.0 mW/cm$^2$ for 20 hours.

The support for photography of the present invention may have one layer or two or more layers laminated, provided that it has at least one layer of the resin layer containing the titanium dioxide according to the present invention. Such laminated layers may be formed mutually of resin films or alternatively in the form coated on a paper.

The thickness of the resin film containing titanium dioxide is not particularly limited, but the support is preferably have a thickness of 50 to 300 $\mu$m, more preferably 75 to 250 $\mu$m. If the thickness is too thin, the nerve as the support is weak to readily form wrinkles, while if it is too thick, shortcomings such as inconvenient handling, etc. may be caused to occur.

For example, by adding the titanium dioxide in an amount of 10% by weight or more, and making the film thickness about 180 $\mu$m, sufficient opaqueness as the support for print can be obtained. Also, by making the amount of the titanium dioxide added about 1% by weight, and the film thickness about 180 $\mu$m, the film becomes translucent to give a support for a light-sensitive material for use in both the reflection type and the transmission type. Further, by adding the titanium dioxide into a polyester in an amount of about 30% by weight, making the film thickness about 30 $\mu$m and laminating the film onto a transparent film, the resultant laminate can be used as the support for photography.

In the present invention, the titanium dioxide can be used in combination with one or two or more kinds of inorganic pigments generally used as white pigments with the titanium dioxide in this field of the art, such as zinc oxide, barium sulfate, silica, talc, calcium carbonate, etc. However, these white pigments which can be used in combination should not exceed 10 parts by weight based on 100 parts by weight of the polyester of the present invention.

In the present invention, the method of filling the above-mentioned titanium dioxide in the polyester is either polymer type adding method or polymer kneading method. As mentioned above, the polymer kneading method is preferred. In such case, kneading is preferably performed under the molten state of the polyester.

In the present invention, as the kneading machine for kneading and dispersing the titanium dioxide in the polyester, there may be employed extruders having rotor or blade for kneading, co-directional or counter-directional rotation type biaxial kneading extruders, continuous kneading machines such as monoaxial type continuous kneaders, etc., or batch system kneading machines such as three rolls, Banbury mixers, Henschel mixers, kneaders, etc. Among them, since kneading can be performed continuously while applying strong shearing force, co-directional rotation type continuous biaxial kneading machines may be preferably used.

In the present invention, the polyester composition obtained by the above-mentioned kneading may be once formed into pellets before provided for film molding, or provided under the molten state. Also, in either method, molding may be conducted with the pigment concentration as such, or a composition with higher pigment concentration, namely the so-called master batch may be prepared, and this may be diluted before molding.

For film molding, for example, the polyester composition obtained by kneading may be extruded under the molten state through a slit die, allowed to contact a quenched surface of a rotatory drum, etc. to form an amorphous sheet and stretched successively in monoaxial direction of the longitudinal or lateral direction or biaxially at the same time at a temperature range from the glass transition temperature (Tg) of the polyester of the present invention to 130° C. In this case, for satisfying the mechanical strength and the dimensional stability of the film support, stretching is preferably performed at an area ratio ranging from 4 to 16-fold, more preferably from 6 to 12-fold. Subsequent to stretching, thermal fixing and thermal relaxation may be preferably effected. Also, during film fabrication, it is preferred to perform filtration with a filter of appropriate grade.

In the present invention, various additives conventionally used such as fluorescent brighteners, dyes, UV-ray absorbers, antistatic agents, etc. can be contained within the range which does not impair the object of the present invention.

On the support for photography of the present invention which has been molded and made opaque or white as described above, a photography constituting layer containing at least one light-sensitive silver halide photographic emulsion layer is provided by coating to prepare a light-sensitive photographic material. In this case, if necessary, prior to coating of the light-sensitive silver halide photographic emulsion layer, a surface activation treatment such as corona charging, etc. may be applied and/or a subbing layer may be provided by coating.

As the coating method of the light-sensitive silver halide photographic emulsion layer, extrusion coating and curtain coating which can coat two or more layers at the same time are particularly useful. Also, the coating speed can be chosen as desired, but a speed of 50 m/min. or faster is preferred in productivity.

The support for photography of the present invention is applicable to all light-sensitive photographic materials, provided that these use a opaque or semitransparent support. For example, the support is not limited in use such as for black-and white or color, etc. It is applicable also in photography constituting layers such as light-sensitive silver halide photographic emulsion layer, intermediate layer, protective layer, filter layer, back coat layer, etc. without particular limitation of layer number and layer order.

In the present invention, the light-sensitive silver halide photographic emulsion layer is a various silver halide emulsion layers conventionally used and, for example, emulsions such as silver chloride, silver bromide, silver chloro-bromide, silver iodobromide, silver chloroiodo-bromide emulsions, etc. can be preferably used. Also, in said photographic emulsion layer, a coupler for forming a color image can be also contained, and as the binder, gelatin or hydrophilic polymeric substances other than gelatin, such as polyvinyl alcohol, polyvinyl pyrrolidone, etc. can be also contained. Further, the above-mentioned silver halide emulsion layer can be also sensitized spectrally with cyanine dyes, melocyanine dyes, etc., and also other various additives for photography, for example, chemical sensitizers by use of gold, sulfur, etc., antifoggants, film hardeners, antistatic agents, etc. can be preferably added. Therefore, the light-sensitive material employing the support of the present invention is applicable to either developing processing for black-and-white or developing processing for color.

EXAMPLES

The present invention is described below by referring to specific examples, but the present invention is not limited to these embodiments.

Example 1

After aqueous solutions of sodium aluminate and sodium silicate were added at ratios of 1% in terms of $Al_2O_3$ and 0.5% in terms of $SiO_2$, respectively, into a slurry of the anatase type titanium dioxide with a mean particle size of 0.35 μm adjusted to a concentration of 300 g/liter, the mixture was adjusted to pH 7.0 with sulfuric acid under thorough stirring to effect the surface treatment with hydrated aluminum oxide and silica.

Then, after stirring was continued at 60° C. for 2 hours, the mixture was filtered, washed and dried.

Subsequently, the surface treated $TiO_2$ was supplied into the rotary kiln adjusted to the respective temperatures shown in Table 1 and oxidized by heating in air atmosphere for 1 hour, and the calcined product was pulverized by a fluid energy mil.

Twenty (20) parts by weight each of the titanium oxides A to H thus obtained and 80 parts by weight of a polyethylene terephthalate having an intrinsic viscosity of 0.80 were melted and kneaded by a codirectional rotatory type twin-screw kneading extruder ZCM53/60 (manufactured by Automatic Co.), followed by pelletizing.

The pellets obtained were each vacuum dried at 180° C. for 6 hours, and then injection molded into a plate of 2×80×40 mm by an injection molding machine (Nippon Seikosho K. K., J-150SA). The plate obtained and the same irradiated with UV ray by Dupanel Photocontrol Weathermeter at a photoenergy of 3.0 $mW/cm^2$ for 20 hours were subjected to measurement of spectral reflectance by a color analyzer Model 607 (Hitachi Seisakusho K. K.). The Lab values (CIE 1976 La*b* color difference or CIELAB color difference) of them were determined by Hunter's color difference formula in the visual field forming a solid angle of 2 degrees by use of a C-light source (Standard Light C) referring to the Appended Table 1 "The Weighting Coefficient for Calculation of Tristimulus Values X, Y and Z of XYZ Chromatic System" of JIS-Z-8722. Then, the difference ΔL value before and after UV irradiation was determined from these Lab values. The results are shown in Table 1.

Next, the same pellets were melted together with 500 ppm of a fluorescent brightener Lucopur EGM (Sand Co.) in an extruder, then extruded through a slit die onto a quenched rotatory drum to be formed into an amorphous sheet with a film thickness of 1.4 mm, subsequently stretched at 95° C. to 2.6-fold in the longitudinal direction, further at 110° C. to 3.0-fold in the lateral direction, followed by thermal fixing at 210° C. and cooling, to give a white opaque film support with a thickness of 180 μm. The whole visible light transmittances of these films were found to be all about 5.0%.

This film was coated with a subbing layer comprising a ternary copolymer of styrene-butadiene-maleic anhydride, then subjected to corona discharging, and a gelatin-silver halide photographic emulsion conventionally used for color photographic printing paper was coated thereon to a dry film thickness of 15 μm, to prepare reflective photographic light-sensitive material samples Nos. 1 to 8.

For each of these samples, whiteness, resolution and projection defects were measured as described below to obtain the results shown in Table 2.

Measurement methods

Resolution

After a dense line chart for measurement of resolution was printed on the reflective light-sensitive photographic material sample and subjected to exposure, developing processing was performed in conventional manner, the optical density difference of the dense line printed image was measured by a microdensitometer PDM-5 (manufactured by Konica K. K.), and the value represented by the following formula is defined as resolution.

$$\text{Resolution (\%)} = \frac{\text{Density difference between } D\text{max and } D\text{min of dense line printed image of 5 lines/mm}}{\text{Density difference between } D\text{max and } D\text{min of dense line printed image of 0.1 line/mm}} \times 100$$

Projection defect: Number of visible surface projections per 100 cm² of reflective photographic element sample was counted and evaluated according to the standards shown below.

| | |
|---|---|
| 0–5/100 cm² | ⊚ most excellent flatness |
| 6–30/100 cm³ | ○ excellent flatness |
| 31–100/100 cm² | Δ not so good flatness |
| 101 or more/100 cm² | X poor flatness |

At a level of or higher, there is no practical problem to give a reflective photographic element excellent in feeling of luster.

Whiteness: Lab of Hunter of the white ground of the photographic material developed without exposure (plain developing) was determined similarly as in the case of plate, and that L value is employed.

TABLE 1

| Titanium dioxide No. | Heat treatment temperature (°C.) | Plate L value | Plate b value | Plate after UV irradiation L value | Plate after UV irradiation b value | ΔL | |
|---|---|---|---|---|---|---|---|
| A | 150 | 89.3 | 1.2 | 87.8 | 2.5 | 1.5 | Comparative example |
| B | 300 | 88.8 | 1.6 | 87.3 | 3.4 | 1.5 | Comparative example |
| C | 400 | 89.8 | 1.3 | 88.9 | 2.6 | 0.9 | Present invention |
| D | 500 | 89.9 | 1.3 | 89.1 | 2.3 | 0.8 | Present invention |
| E | 600 | 90.0 | 1.5 | 89.4 | 2.1 | 0.6 | Present invention |
| F | 700 | 90.2 | 1.5 | 89.8 | 1.9 | 0.4 | Present invention |
| G | 800 | 90.1 | 1.7 | 89.5 | 2.4 | 0.6 | Present invention |
| H | 900 | 90.1 | 1.9 | 89.4 | 3.3 | 0.7 | Present invention |

TABLE 2

| Photographic light-sensitive material sample No. | Titanium dioxide No. | Plain developing L value | Plain developing b value | |
|---|---|---|---|---|
| 1 | A | 93.4 | −1.0 | Comparative example |
| 2 | B | 91.1 | −0.6 | Comparative example |
| 3 | C | 95.3 | −1.2 | Present invention |
| 4 | D | 95.6 | −1.5 | Present invention |
| 5 | E | 95.9 | −1.7 | Present invention |
| 6 | F | 96.1 | −1.9 | Present invention |
| 7 | G | 95.7 | −1.4 | Present invention |
| 8 | H | 95.6 | −1.0 | Present invention |

All of the samples Nos. 1 to 8 had about 65% of resolution, and good projection defect evaluation of ⊚.

As is apparent from Table 2, all of the samples Nos. 3 to 8 have greater L-values and higher whiteness as compared with Samples Nos. 1 and 2 outside the present invention.

Example 2

Forty (40) parts by weight of the titanium dioxide F used in Example 1 and 60 parts by weight of a polybutylene terephthalate were melted and kneaded by a kneader (ZCM53/60), followed by pelletizing.

The pellets obtained and the polybutylene terephthalate were mixed at 1:1, vacuum dried at 130° C. for 4 hours and then molded into a plate by an injection molding machine.

The plate had a L value of 90.6 and a b value of 1.9. The L value of the plate after UV irradiation similarly as in Example 1 was found to be 90.0, and the b value 2.2.

Next, the above pellets were vacuum dried at 130° C. for 4 hours, then melted together with 500 ppm of a fluorescent brightener Lucopur EGM (Sand Co.) in an extruder, and thereafter extruded through a slit die to be laminated with a thickness of 30 μm onto a polyethylene terephthalate film with a thickness of 180 μm.

The film was coated with the emulsion in the same manner as in Example 1 to prepare a light-sensitive material.

The light-sensitive material obtained was found to have a resolution of 72%, and good projection defect evaluation of ⊚. Also, plain developing whiteness was good, with L value being 95.9.

Example 3

The experiment of Example 1 was repeated by using the same titanium dioxide as a starting material and choosing the heat treatment temperature of 700° C. excepting for not conducting the pulverization by a fluid energy mil. After the plate molding and film forming under the same condition as in Example 1, the same tests were conducted, respectively. The results are shown in Table 3 and Table 4.

TABLE 3

| Titanium dioxide No. | Heat treatment temperature (°C.) | Plate L value | Plate b value | Plate after UV irradiation L value | Plate after UV irradiation b value | ΔL |
|---|---|---|---|---|---|---|
| 1 | 700 | 90.1 | 1.6 | 89.6 | 2.0 | 0.5 |

TABLE 4

| Photographic light-sensitive material sample No. | Titanium dioxide No. | Plain developing L value | Plain developing b value | |
|---|---|---|---|---|
| 9 | 1 | 94.3 | −1.3 | Present invention |

The resolution was 58% and the projection defect evaluation was not so good flatness by Δ. Accordingly, the sample is good in L value, but not so good in the resolution and projection defect evaluation.

As described in detail above, by taking the constitution of the present invention, a polyester composition with good dispersibility of titanium dioxide can be obtained, and also by having a polyester layer comprising said polyester composition, a support for photography excellent in sharpness and also improved in whiteness can be obtained.

We claim:

1. In a support for a light-sensitive material, carrying light-sensitive silver halide emulsions for use in photography to produce an image for direct observation, and having a polyester layer consisting essentially of a polyester and a titanium dioxide white pigment, the improvement comprising said titanium dioxide having been coated with an organic or inorganic compound and thereafter subjected to a heat treatment under a non-reducible atmosphere at a temperature of 350° C. or higher, and wherein the organic compound is a siloxane polymer;

the inorganic compound is at least one selected from the group consisting of an aluminum compound and a silicon compound; and said titanium compound is present in an amount of about 1 to 40% by weight based on the polyester.

2. The support for photography according to claim 1, wherein the support has a laminated structure of at least two layers.

3. In a support for comprising a polyester layer containing a titanium dioxide and a film of the white polyester composition which is formed by melt a light-sensitive material, carrying light-sensitive silver halide emulsions for use in photography to produce an image for direct observation, and having a polyester layer consisting essentially of a polyester and a titanium dioxide white pigment, which polyester layer is formed by melt extrusion and biaxial stretching, the improvement comprising said titanium dioxide has been coated with an organic or inorganic compound and thereafter subjected to a heat treatment under a non-reducible atmosphere at a temperature of 350° C. or higher, and wherein the organic compound is a siloxane polymer;

the inorganic compound is at least one selected from the group consisting of an aluminum compound and a silicon compound; and said titanium compound is present in an amount of about 1 to 40% by weight based on the polyester.

4. The support for photography according to claim 3, wherein the support has a laminated structure of at least two layers.

5. The support for photography according to claim 1, wherein the temperature of the heat treatment is in the range of from 600° through 800°.

6. The support for photography according to claim 1, wherein the titanium dioxide having been subjected to the heat treatment is further pulverized.

7. The support for photography according to claim 1, wherein the pulverized titanium dioxide is further subjected to a coating treatment with an organic material.

8. The support for photography according to claim 1, wherein the organic material is at least one selected from the group consisting of fatty acid metal salts, surfactants, coupling agents, alcohols and silicone oils.

9. The support for photography according to claim 1, wherein the titanium dioxide is such that the difference in L value before and after UV-ray irradiation at a photoenergy of 3.0 mW/cm$^2$ on a plate with a thickness of about 2 mm, comprising an injection molded product of a polyethylene terephthalate resin after addition of the titanium dioxide therein, for 20 hours is 1.0 or less.

10. The support for photography according to claim 1, wherein said titanium dioxide is an anatase type titanium dioxide.

11. The support for photography according to claim 1, wherein said compound used to coat the titanium dioxide is the siloxane polymer.

12. The support for photography according to claim 1, wherein the inorganic compound is used to coat the titanium dioxide.

13. The support for photography according to claim 12, wherein said aluminum compound is used and is an aluminum hydroxide.

14. The support for photography according to claim 12, wherein said silicon compound is used and is a silicon hydroxide.

15. The support for photography according to claim 1, wherein the titanium dioxide has a mean particle size in the range of from 0.1 to 0.5 μm.

16. The support for photography according to claim 1, wherein the titanium dioxide is contained in an amount of 10% by weight or more in the polyester.

17. The support for photography according to claim 1, wherein said polyester is at least one of polymers of condensates of an aromatic dicarboxylic acid with a glycol and copolymers thereof.

18. The support for photography according to claim 17, wherein the polyester is polyethylene terephthalate.

19. The support for photography according to claim 17, wherein said aromatic dicarboxylic acid is at least one selected from the group consisting of terephthalic acid, isophthalic acid, phthalic acid and naphthalene dicarboxylic acid.

20. The support for photography according to claim 1, wherein the polyester is at least one selected from the group consisting of polyethylene terephthalate, polyethylene 2,6-dinaphthalate, polypropylene terephthalate and polybutylene terephthalate.

21. The support for photography according to claim 19, wherein said glycol is at least one selected from the group consisting of ethylene glycol, 1,3-propane diol and 1,4-butane diol.

* * * * *